United States Patent [19]

Merritt et al.

[11] Patent Number: 4,500,827
[45] Date of Patent: Feb. 19, 1985

[54] LINEAR RECIPROCATING ELECTRICAL GENERATOR

[76] Inventors: Thomas D. Merritt; Mario J. Pasichinskyj, both of 9025 Hawthorne St., Surfside, Fla. 33154

[21] Appl. No.: 619,080

[22] Filed: Jun. 11, 1984

[51] Int. Cl.³ ............................................. H02K 35/00
[52] U.S. Cl. ........................................ 322/3; 310/15; 290/1 R
[58] Field of Search ................ 290/1; 322/3; 310/12, 310/15, 30

[56] References Cited

U.S. PATENT DOCUMENTS

| | | | |
|---|---|---|---|
| 2,409,857 | 10/1946 | Hines et al. | 310/15 |
| 2,740,946 | 4/1956 | Geneslay | 310/150 X |
| 3,102,205 | 8/1963 | Combs | 290/1 |
| 3,105,153 | 9/1963 | James, Jr. | 310/15 X |
| 3,559,027 | 1/1971 | Arsem | 322/3 |
| 4,151,447 | 4/1979 | von der Heide | 310/12 X |

*Primary Examiner*—Donovan F. Duggan
*Attorney, Agent, or Firm*—Melvin K. Silverman

[57] ABSTRACT

There is disclosed herein an electrical generator which includes a linear reciprocating armature mechanically coupled with a source of relative motion. The armature comprises a plurality of magnet means defining north-south poles in alternately opposite directions, the axis of the poles being orthogonal to the direction of reciprocation of the armature. Each of said pole magnets is mounted parallel at relative distances to each other that are equal to their widths in the direction of armature reciprocation. Further provided in the generator is a stator including a plurality of groups of continuous windings, each group corresponding to an adjacent pair of magnet means, each group wound parallel to a plane defined by the direction of reciprocation of the armature and the center point of the axis of the poles of the magnet means. Each winding has a width equal to the width of each pole of the magnet means in the direction of armature reciprocation. Also, each winding group is separated from the adjoining group by a width equal to the pole of each magnet. There is further provided means for limiting the advance and reverse of the armature to a distance equal to three times the width of each pole of each magnet. Also furnished is a housing that will place the stator as close to the armature as possible in order to minimize the air gap therebetween.

5 Claims, 7 Drawing Figures

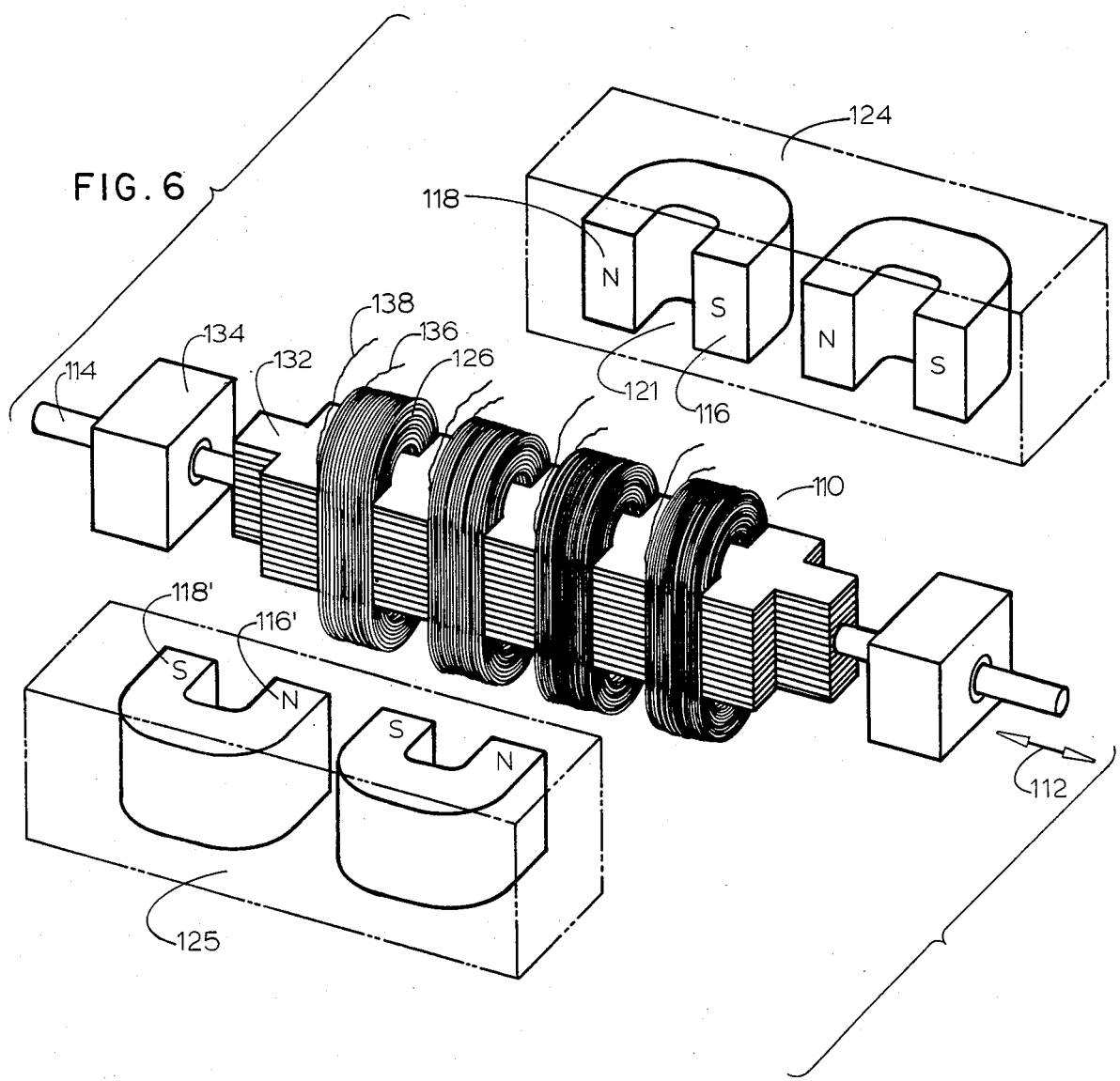

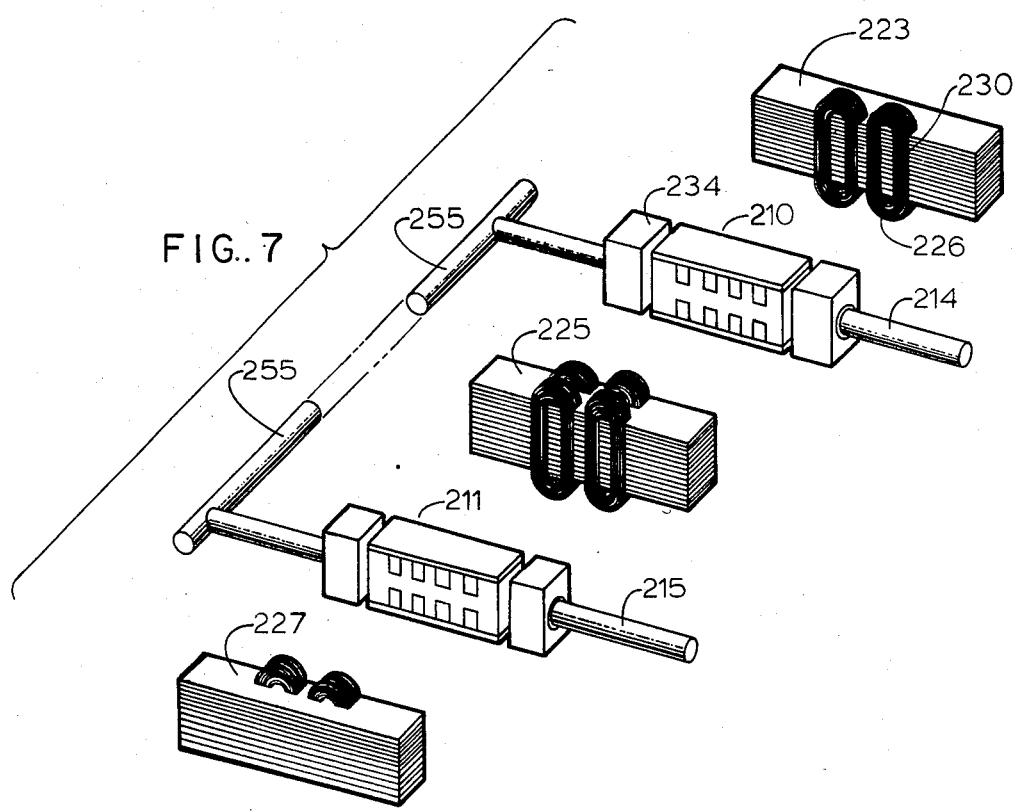

LINEAR RECIPROCATING ELECTRICAL GENERATOR

BACKGROUND OF THE INVENTION

The present invention relates to electrical generators and, more particularly, to generators of the linear reciprocating type that may be directly coupled to a source of mechanical motion or energy, this occurring where there exists a changing translational motion between any two bodies.

An electrical generator of the present type has application in such areas as the utilization of the vertical vibration within the suspension system of an automotive vehicle, state of the art windmills, and power system which make use of the undulating motion of sea waves. An additional application lies in the continually changing horizontal relationship between a tractor and its trailer during the normal movement of the tractor and trailer along the highway.

The most pertinent prior art known to the inventors is U.S. Pat. Nos. 1,911,952 to Murphy; 2,644,920 to Tierney; 3,527,188 to Shepard; and 3,559,027 to Arsen. Also of relevance is IBM Technical Disclosure Bulletin entitled, "Linear Reluctance Punch", Volume 12, No. 7, December, 1969. The Patents to Arsen and Shepard respectively indicate the recognition of the prior art that there exists considerable lost energy in the vertical vibration of an automobile during normal operation along the road, and that the changing motion of sea water relative to a body such as a ship or floating platform represents a considerable source of mechanical energy which is potentially convertable into more useful forms.

The proper areas of classification of the present invention are believed to be U.S. Class No. 310, Sub-class 28; and U.S. Class 180, Sub-class 165.

SUMMARY OF THE INVENTION

This invention relates to an electric generator comprising a linear reciprocating armature mechanically coupled to a source of motion, said armature comprising a plurality of magnet means defining north-south poles in alternately opposite directions, the axis of said poles being orthogonal to the direction of reciprocation of said armature, each of said pole magnet means mounted parallel and lengthwise at relative distances equal to their widths in the direction of armature reciprocation. Also provided is a stator comprising a plurality of coil groups of continuous windings, each group corresponding to an adjacent pair of magnets, each group being wound parallel to the plane defined by the direction of reciprocation of said armature and a center point upon the axis of the poles of said magnet means, each winding group having a width equal, in the direction of armature reciprocation, to the width of each magnet means, and each side of each winding group being spaced from the other side thereof by the width of the winding group in the direction of armature reciprocation. Further provided are means for limiting the advance and retreat of the armature to a linear length equal to three times the width of the pole of each magnet in the direction of armature reciprocation. In addition, there is provided a means for tapping of the current induced into each coil group and for the providing of such current to a load. Further, there is provided means for the positioning of the stator magnetically proximate to the reciprocating armature.

Also provided is a plurality of rectifying electric circuits, one for each winding group, for receiving current induced from the reciprocation of said armature by said source of motion, said circuits including an output for connection to the load.

It is an object of the present invention to provide a novel electric generator having particular utility in the use of mechanical energy imparted to the suspension system of an automotive vehicle in the course of the normal operation of such vehicle on a highway.

It is further object to provide an electric generator having particular utility in the capture, recovery and efficient usage of any naturally occurring source of mechanical motion as, for example, occurs in the undulating motion of sea water and in the motion of wind across the earth's surface.

It is a still further object of the invention to provide a special purpose electrical generator capable of employing linear reciprocating mechanical motion of whatever source and, more generally, capable of utilizing any relatively changing translational motion between any two bodies, regardless of the source or cause of such motion.

A further object is to provide a means for recovering and capturing the energy involved in the continually-changing horizontal relationship between a tractor and its trailer in the course of normal operation upon a highway.

The above and yet further objects and advantages of the present invention will become apparent from the hereinafter set forth Detailed Description of the Invention, the Drawings, and appended claims.

BRIEF DESCRIPTION OF THE DRAWINGS

FIG. 6 is an exploded, isometric, schematic view of a second embodiment of the invention.

FIG. 7 is an exploded view of a multiple armature and multiple stator embodiment of the embodiment of FIG. 1.

DETAILED DESCRIPTION OF THE INVENTION

Figure 1:
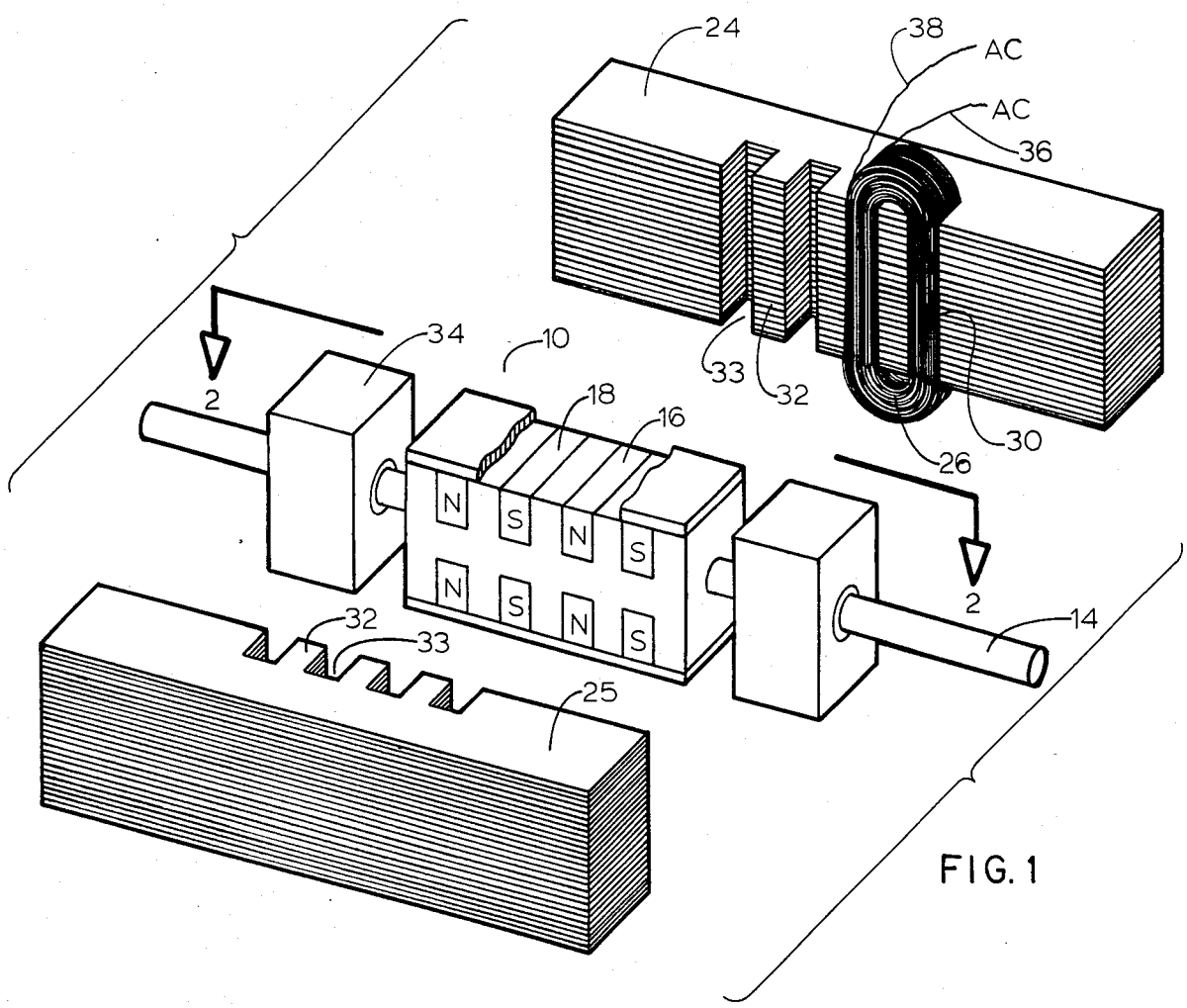
FIG. 1 is a isometric, exploded, schematic view of a preferred embodiment of the present invention.
Figure 2:
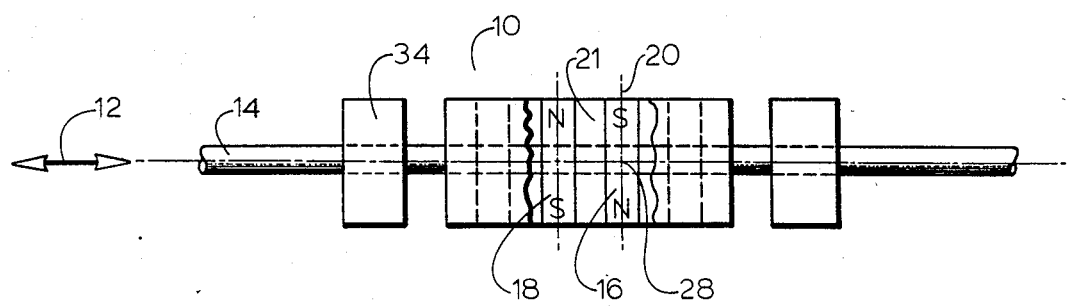
FIG. 2 is a top schematic view of the armature of the embodiment of FIG. 1.

With reference to FIGS. 1 and 2, there is shown an electric generator having a linear reciprocating armature 10 which is mechanically coupled to a source of linear reciprocating motion 12. The armature includes a longitudinal elongate member 14 upon which is housed a plurality of pole magnets 16 and 18 which define north-south poles in alternatively opposite directions, the magnets 16 representing north-to-south poles from the direction of the view of FIG. 1. It is noted that the axis 20 of the poles of the magnets are orthogonal to the direction of reciprocation of the armature 10. Each of said pole magnets are mounted parallel to each other at relative distances 21 which are equal to the widths of the magnets 16 and 18 in the direction 12 of linear reciprocation of the armature.

The present novel electric generator also includes at least one stator 24 comprising a plurality of winding groups 26 formed of continuous windings. Each winding group corresponds to an adjacent pair of opposing pole magnets 16 and 18, and each coil group is wound parallel to the plane defined by the direction of reciprocation 12 of the armature 10 and a center point 28 upon the axis 20 of the poles of said magnets 16 and 18. Each winding group has a width-wise separation 33 which is equal to the width of each magnet in the direction 12 of armature reciprocation. Additionally, each side 30 of each winding group 26 is spaced from the other side of the adjoining winding group by a width equal to the width of the magnets 16 and 18 in the direction of armature reciprocation. Accordingly, the "teeth" 32 of the stator 24 possess a width equal to the width of the magnets 16 and 18 in the direction 12 of reciprocation. Additionally, it is noted that all dimensions of the elements 16, 18, 21, 30, 32, 33 are substantially equal to each other in the direction of armature reciprocation.

With further regard to the structure of the armature 10, there is provided means 34 for limiting the advance and retreat of the elongate member 14, and the entire armature 10 to three times the width of each magnet in the direction of reciprocation. Accordingly, each stroke of the armature 10 relative to the stator 24 is limited such that the lines of the magnetic field of the coil groups 26 are cut only one time by one magnet on each advance or reverse stroke of the armature 10.

Also provided are means 36 and 38 for tapping the induced current into each winding group 26, such means including means 42 for providing such current to a load. In a preferred embodiment, tapping means 36 and 38 will connect into a full wave bridge rectifier 40 (see FIG. 3) in order to provide pulsating DC output means 42 which may then be used in many applications.

Not shown in FIGS. 1 and 2 are housing means for positioning the stator magnetically adjacent to the armature. It is most important that the ends of the poles of the magnets 16 and 18 be disposed as close to the winding groups 26 as possible. This is necessary in order to minimize any air gap between the magnets and the winding group, thereby maximizing the efficiency of the electromagnetic induction of current.

With reference to the theory of operation of the present invention, it is known that the induced electrical current into a winding group is directly proportional to the product of the density of the magnetic flux through which the coils are moved, the length of conductor's movement through the magnetic field, and the velocity of movement of the armature through the field, this generally being expressed by the equation:

$$E = Hlv,$$

in which
E = electrical energy
H = magnetic field density
l = length of conductor's movement, stroke; and
v = armature velocity relative to stator In the present application, velocity is the key multiplier inasmuch as the magnetic field and the length of the stroke of the armature relative to the stator will typically be limited by design considerations involved in a particular application. Accordingly, it is most important to maximize the velocity of the reciprocation of the armature relative to the stator in order to maximize the electrical output of the generator. It has been found that many naturally occurring phenomena, including the normal vertical reciprocating action of an automobile chassis relative to the highway, will produce relative motion of very high velocity, as will the continually changing horizontal relationship between a tractor and a trailer on the highway.

It is noted that the design of the present generator, and in particular the taping means 36 and 38 are such that a winding group and its adjoining pair of magnets 16 and 18 will define a cell from which the electrical outputs thereof may be stacked in parallel, series, or any combination thereof, in order to obtain enhanced voltage or current outputs as may be required in a given application. Further to this, it is to be appreciated that various switching arrangements may be employed in order to selectively sum or otherwise manipulate aggregate current and voltage outputs of the winding groups to accomodate the requirements of a given application.

In different applications, such as those involving the motion of sea water relative to a platform therein, where high mechanical input velocities will not be available, it will be necessary to enhance the number of magnets and coil groups in order to maximize the electrical output of the system, such as in the embodiment of FIG. 7, later described herein. Also, through the use of accumulators, up-gearing and/or fulcrums, the input velocity from the local environmental input can be multiplied.

Figure 3:
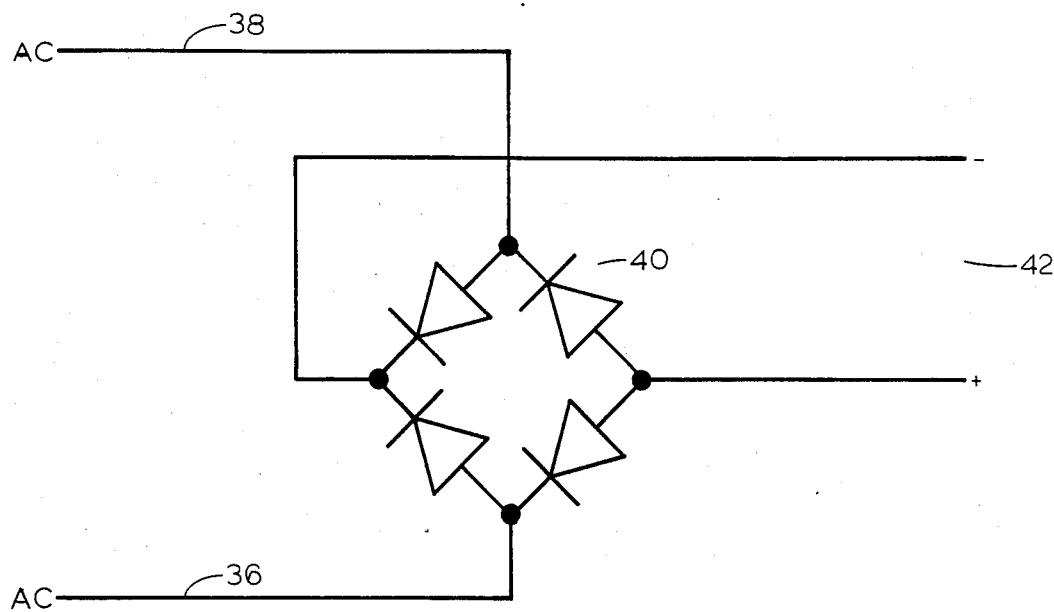
FIG. 3 is an electrical schematic of a preferred rectifying arrangement for use in association with pole groups of the present generator.

As the name of the present generator infers, there will be a continually-changing direction in the electrical output of the generator. Therefore, as shown in FIG. 3, it will, in many applications be necessary to rectify this output in order to produce a pulsating DC current which, in turn, can be regulated as necessary in a given requirement.

It is to be also understood that the present invention may be provided with either a single stator 24 or double stator 24 and 25. In the view of FIGS. 1 and 2, which is the preferred embodiment, a stator is provided at each side of the armature, and this has been found to be the most efficient design. However, in principle, significant amounts of electricity could be obtained with a single stator design. Additionally, the present generator may be provided with a plurality of armatures, similar in concept to the single armature shown in FIG. 1. Such a plurality of armatures would produce an enhanced magnetic flux and, thereby, a greater induced current at the coil outputs 36 and 38. An example of such an arrangement is shown in FIG. 7, in which is shown a plurality of armatures 210 and 211 and a plurality of stators 223, 225 and 227. The armatures are jointly reciprocated by bar 225. It is to be appreciated that the stator and armature groups can be stacked vertically as well as horizontally (as shown in FIG. 7).

The stator 24 is, ideally, formed of a soft ferrous material in that such materials are the best magnetic conductors. In production of the stator, a multiplicity of stacked and bonded laminate plates are typically used.

Figure 4:
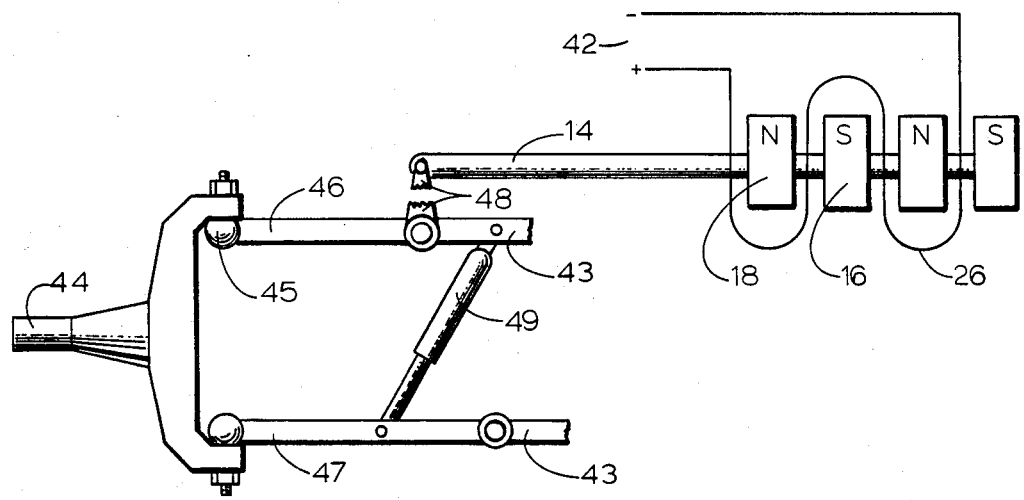
FIG. 4 is an electromechanical schematic view of one type of coupling of the input of the present electric generator to a source of relative motion.
Figure 5:
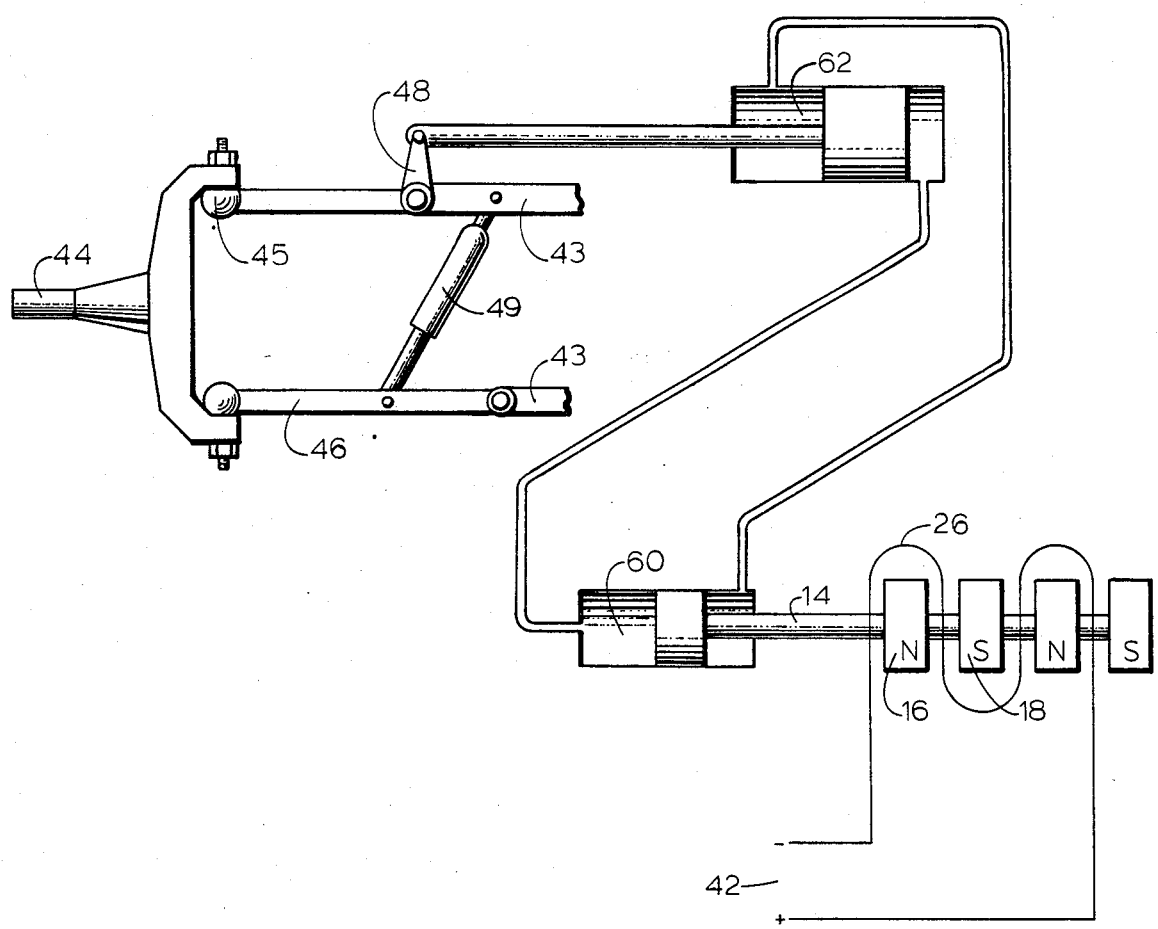
FIG. 5 is an electromechanical schematic view of a hydraulic coupling of the input of the present electrical generator to a relative source of motion.

With reference to FIGS. 4 and 5, there are shown two means of mechanically coupling the input 14 of the generator to the output of an automobile control arm 46 and 47; and its shock springs. In FIG. 4, there is, in schematic, shown an axle 44, a ball joint 45, upper control arm 46, lower control arm 47, and shock absorber 49, and a drive element 48. Through this arrangement, the mechanical reciprocation of the upper control arm 46 can be transmitted to the generator through mechanical input 14 which, thereby, will power the armature 10 regardless of any irregularity in characteristic of the naturally changing mechanical motion between the two bodies from which the linear reciprocating mechanical input is to be derived.

Another embodiment of the present novel generator is shown in FIG. 6. In this embodiment, winding groups 126 are mounted upon an armature 110 and pole magnets 116 and 118 are mounted upon a stator 124. In terms of magnet circuitry, this arrangement is an analogue of the design of FIG. 1 in that the individual winding groups are "mated" with pairs of magnets having alternately opposite poles, and are caused to cut the magnetic lines of such magnets in the same manner. Accordingly, all theoretical considerations of design and operation above discussed with reference to the embodiment of FIG. 1 are equally applicable to the embodiment of FIG. 6.

Accordingly, while there have been shown and described the preferred embodiments of the present invention, it will be understood that the invention may be embodied otherwise than as herein specifically illustrated or described and that within said embodiments certain changes in the detail and construction, and the form of arrangement of the parts may be made without departing from the underlying idea or principles of this invention within the scope of the appended claims.

Having thus described our invention, what we claim as new, useful and non-obvious and, accordingly, secure by Letters Patent of the United States is:

1. An electric generator, comprising:
   (a) a linear reciprocating armature mechanically coupled to a source of relative motion, said armature comprising a plurality of magnet means defining north-south poles in alternately opposite pole direction, the axis of said poles being orthogonal to the direction of reciprocation of said armature, each of said pole magnet means mounted parallel to each other at relative distances equal to their widths in the direction of armature reciprocation;
   (b) a stator comprising a plurality of groups of continuous windings, each winding group corresponding to a physically adjacent pair of magnet means, each winding group wound parallel to a plane defined by the direction of reciprocation of said armature and a center point of the axis of the poles of said magnet means, each winding having a width equal to the width of each magnetic pole in the direction of armature reciprocation, and each side of each winding group separated from the next winding group by a space equal to the width of a pole of each magnet means in the direction of armature reciprocation;
   (c) means for limiting the advance and reverse of the armature to three times the width of the pole of each magnet means in the direction of armature reciprocation;
   (d) means for taping the induced current in each coil group and for providing such current to a load; and
   (e) housing means for positioning the stator magnetically adjacent to the armature to minimize the air gap between the poles and the windings.

2. An electric generator, comprising:
   (a) a linear reciprocating armature mechanically coupled to a source of motion, said armature comprising a plurality of groups of continuous windings, each winding group being orthogonal to the direction of reciprocation of said armature, each winding group having substantially the same width in the direction of reciprocation of said armature, each coil group being separated, upon said armature, from the adjacent winding group by a width of core, said width being substantially equal to the width of each winding group in the direction of armature reciprocation;
   (b) a stator comprising a plurality of magnet means defining north-south poles in alternately opposite directions, the axis of said poles being orthogonal to the direction of reciprocation of said armature, each of said pole magnets mounted parallel and at relative distances equal to their widths in the direction of reciprocation of said aramature, each pair of alternate magnets corresponding to one coil group;
   (c) means for limiting the advance and reverse of reciprocation of the armature to three times the width of each pole of each magnet means in the direction of armature reciprocations;
   (d) means for taping the induced current into each coil group and for providing such current to a load; and
   (e) housing means for positioning the stator adjacent to the armature so as to minimize the gap therebetween.

3. The generator as recited in claim 1 or 2 in which said load connected to said taping means comprises a full bridge wave rectifier, yielding a pulsating DC output.

4. The generator as recited in claim 1 or 2 in which said stator comprises a pair of stators, each stator of said pair disposed adjacent to the opposite pole axis of said armature.

5. The generator as recited in claim 1 or 2 in which said mechanical coupling of said armature to said source of motion comprises a hydraulic coupling, whereby the mechanical characteristics of the naturally occurring source of relative can be hydraulically modified in order to provide an input to the generator which may be more advantageously utilized by the generator in order to maximize the electrical output thereof.

* * * * *